(12) United States Patent
Noda et al.

(10) Patent No.: US 9,912,056 B2
(45) Date of Patent: Mar. 6, 2018

(54) MULTIBAND ANTENNA AND MANUFACTURING METHOD THEREOF

(71) Applicants: Hiroyuki Noda, Mie (JP); Tomokazu Sonozaki, Mie (JP)

(72) Inventors: Hiroyuki Noda, Mie (JP); Tomokazu Sonozaki, Mie (JP)

(73) Assignee: NTN CORPORATION, Osaka (JP)

(*) Notice: Subject to any disclaimer, the term of this patent is extended or adjusted under 35 U.S.C. 154(b) by 127 days.

(21) Appl. No.: 14/384,884

(22) PCT Filed: Mar. 14, 2013

(86) PCT No.: PCT/JP2013/057251
§ 371 (c)(1),
(2) Date: Sep. 12, 2014

(87) PCT Pub. No.: WO2013/137404
PCT Pub. Date: Sep. 19, 2013

(65) Prior Publication Data
US 2015/0061963 A1 Mar. 5, 2015

(30) Foreign Application Priority Data

Mar. 16, 2012 (JP) ................. 2012-060231

(51) Int. Cl.
*H01Q 5/00* (2015.01)
*H01Q 21/28* (2006.01)
(Continued)

(52) U.S. Cl.
CPC ....... *H01Q 5/0072* (2013.01); *B29C 45/1671* (2013.01); *H01Q 5/371* (2015.01);
(Continued)

(58) Field of Classification Search
CPC ........ H01Q 5/0072; H01Q 5/371; H01Q 1/38; H01Q 1/243; H01Q 9/0407; H01Q 21/28
(Continued)

(56) References Cited

U.S. PATENT DOCUMENTS 5,631,660 A * 5/1997 Higashiguchi ........... H01Q 1/38
343/700 MS
6,501,425 B1 12/2002 Nagumo et al.
(Continued)

FOREIGN PATENT DOCUMENTS

EP 1 930 216 6/2008
JP 2002-299936 10/2002
(Continued)

OTHER PUBLICATIONS

Chinese Office Action dated Aug. 25, 2015 in corresponding Chinese Patent Application No. 201380013266.3 with English translation.
(Continued)

*Primary Examiner* — Dameon E Levi
*Assistant Examiner* — Ab Salam Alkassim, Jr.
(74) *Attorney, Agent, or Firm* — Wenderoth, Lind & Ponack, L.L.P.

(57) ABSTRACT

A multiband antenna includes a first antenna unit (10) and a second antenna unit (20). The first antenna unit (10) includes a first antenna pattern (11) formed of a conductor and a first substrate (12) formed of a dielectric, for holding the first antenna pattern (11). The second antenna unit (20) includes a second antenna pattern (21) formed of a conductor and a second substrate (22) formed of a dielectric having a dielectric constant different from the dielectric constant of the first substrate (12), for holding the second antenna pattern (21). In the multiband antenna, by injection molding the second substrate (22) with the first antenna unit (10) and the second (Continued)

antenna pattern (21), which being insert components, the first antenna unit (10) and the second antenna unit (20) are integrated.

6 Claims, 3 Drawing Sheets

(51) Int. Cl.
*H01Q 5/371* (2015.01)
*H01Q 9/04* (2006.01)
*B29C 45/16* (2006.01)
*H01Q 1/38* (2006.01)
*H01Q 1/24* (2006.01)
*B29L 31/34* (2006.01)
*B29C 45/14* (2006.01)

(52) U.S. Cl.
CPC ........... *H01Q 9/0407* (2013.01); *H01Q 21/28* (2013.01); *B29C 45/14639* (2013.01); *B29L 2031/3456* (2013.01); *H01Q 1/243* (2013.01); *H01Q 1/38* (2013.01); *Y10T 29/49016* (2015.01)

(58) Field of Classification Search
USPC .................................. 343/893, 702, 700 MS
See application file for complete search history.

(56) References Cited

U.S. PATENT DOCUMENTS

| | | | |
|---|---|---|---|
| 6,618,014 B2 * | 9/2003 | Stoiljkovic | H01Q 1/24 343/702 |
| 8,896,489 B2 * | 11/2014 | Larsen | H01Q 1/243 343/700 MS |
| 9,337,532 B2 * | 5/2016 | Vanjani | H01Q 1/243 |
| 9,368,856 B2 * | 6/2016 | Lee | H01P 11/00 |
| 9,748,668 B2 * | 8/2017 | Wang | H01Q 21/30 |
| 2004/0150563 A1 * | 8/2004 | Oshiyama | H01Q 9/0407 343/700 MS |
| 2005/0099344 A1 * | 5/2005 | Okubo | H01Q 1/243 343/702 |
| 2005/0264458 A1 | 12/2005 | Takagi et al. | |
| 2006/0238423 A1 | 10/2006 | Ozden | |
| 2007/0277927 A1 * | 12/2007 | Momose | B29C 66/73521 156/272.8 |
| 2008/0067715 A1 * | 3/2008 | Sung | B29C 45/14811 264/279 |
| 2008/0129605 A1 * | 6/2008 | Sakurai | H01Q 1/243 343/700 MS |
| 2008/0252532 A1 * | 10/2008 | Oh | H01Q 1/243 343/700 MS |
| 2009/0020328 A1 | 1/2009 | Sullivan et al. | |
| 2009/0135082 A1 * | 5/2009 | Hou | H01Q 1/38 343/878 |
| 2009/0262023 A1 | 10/2009 | Ying et al. | |
| 2010/0012372 A1 | 1/2010 | de Zwart et al. | |
| 2010/0039345 A1 | 2/2010 | Kim et al. | |
| 2010/0097272 A1 * | 4/2010 | Kim | H01Q 1/243 343/700 MS |
| 2011/0074641 A1 * | 3/2011 | Sotoma | H01Q 1/243 343/702 |
| 2011/0134015 A1 * | 6/2011 | Yang | B29C 45/1671 343/878 |
| 2011/0148716 A1 * | 6/2011 | Sotoma | H01Q 1/243 343/700 MS |
| 2012/0139796 A1 * | 6/2012 | Park | H01Q 1/38 343/700 MS |
| 2013/0076573 A1 * | 3/2013 | Rappoport | H01Q 1/243 343/702 |

FOREIGN PATENT DOCUMENTS

| | | |
|---|---|---|
| JP | 2003-142936 | 5/2003 |
| JP | 2003-198230 | 7/2003 |
| JP | 2003198230 A * | 7/2003 |
| JP | 2005-80229 | 3/2005 |
| JP | 2005-130532 | 5/2005 |
| JP | 2009-278376 | 11/2009 |
| JP | 2010-081098 | 4/2010 |
| JP | 2011-130239 | 6/2011 |
| JP | 2011-521513 | 7/2011 |
| KR | 10-2011-0057584 | 6/2011 |
| WO | 01/018909 | 3/2001 |

OTHER PUBLICATIONS

International Preliminary Report on Patentability and Written Opinion of the International Searching Authority dated Sep. 16, 2014 in International (PCT) Application No. PCT/JP2013/057251.
Extended European Search Report dated Oct. 6, 2015, in corresponding European Application No. 13761978.9.
International Search Report dated Jun. 18, 2013 in International (PCT) Application No. PCT/JP2013/057251.

* cited by examiner

MULTIBAND ANTENNA AND MANUFACTURING METHOD THEREOF

TECHNICAL FIELD

The present invention relates to a multiband antenna capable of receiving radio waves in a plurality of frequency bands, and a method of manufacturing a multiband antenna.

BACKGROUND ART

A substrate-mounted antenna (chip antenna) to be incorporated into wireless communication equipment, such as a cellular phone, generally includes an antenna pattern formed of a conductor and a substrate formed of a dielectric, such as a resin or ceramic, for holding the antenna pattern (see, for example, Patent Literature 1).

In recent years, as the wireless communication equipment, such as the cellular phone, becomes multifunctional, the number of the equipment is increased, which is capable of receiving not only radio waves for conversation but also a plurality of kinds of radio waves in different frequency bands, such as radio waves for a wireless LAN, GPS, or Bluetooth (trademark). For example, in Patent Literature 2, there is disclosed a multiband antenna as an antenna to be incorporated into this kind of wireless communication equipment, which can receive radio waves in a plurality of frequency bands through devised circuit design of an antenna pattern.

CITATION LIST

Patent Literature 1: JP 2005-80229 A
Patent Literature 2: JP 2009-278376 A

SUMMARY OF INVENTION

Technical Problem

However, when the frequency bands of radio waves to be received are significantly different from one another, there are cases in which devised circuit design of the antenna pattern as disclosed in Patent Literature 2 is insufficient.

Further, by incorporating a plurality of chip antennas into wireless communication equipment and causing substrates of the respective chip antennas to have different dielectric constants, receiving of a plurality of kinds of radio waves in frequency bands that are significantly different from one another is possible. However, not only separate manufacturing of the plurality of chip antennas increases the manufacturing cost but also installation space for incorporating the plurality of chip antennas into the inside of the wireless communication equipment is necessary.

An object to be achieved by the present invention is to provide a multiband antenna, which can receive radio waves in a wide range of frequency bands, which can be manufactured at low cost, and which can be installed in small space.

Solution to Problems

According to one embodiment of the present invention, which has been made to solve the above-mentioned problems, there is provided a multiband antenna, comprising a first antenna unit and a second antenna unit, the first antenna unit comprising a first antenna pattern formed of a conductor and a first substrate formed of a dielectric, for holding the first antenna pattern, the second antenna unit comprising a second antenna pattern formed of a conductor and a second substrate formed of a dielectric having a dielectric constant different from the dielectric constant of the first substrate, for holding the second antenna pattern, wherein, by injection molding the second substrate with the first antenna unit and the second antenna pattern, which being insert components, the first antenna unit and the second antenna unit are integrated.

Further, according to one embodiment of the present invention, there is provided a method of manufacturing a multiband antenna, the multiband antenna comprising a first antenna unit and a second antenna unit, the first antenna unit comprising a first antenna pattern formed of a conductor and a first substrate formed of a dielectric, for holding the first antenna pattern the second antenna unit comprising a second antenna pattern formed of a conductor and a second substrate formed of a dielectric having a dielectric constant different from the dielectric constant of the first substrate, for holding the second antenna pattern, the method comprising the steps of: forming the first antenna unit; and integrating the first antenna unit and the second antenna unit by injection molding the second substrate with the first antenna unit and the second antenna pattern, which being insert components.

In this way, by providing the first antenna unit and the second antenna unit in the multiband antenna and by causing the substrates of the respective antenna units to have different dielectric constants, radio waves in a wide range of frequency bands can be received. Further, by injection molding the second substrate with the first antenna unit and the second antenna pattern being insert components, the first antenna unit and the second antenna unit can be integrated simultaneously with the formation of the second antenna unit. Thus, the man-hour can be reduced to reduce the manufacturing cost. Further, by integrating the first antenna unit and the second antenna unit, compared with a case in which a plurality of chip antennas separately formed are incorporated into wireless communication equipment, installation space can be reduced.

The first antenna unit may be formed by injection molding the first substrate with the first antenna pattern being an insert component, for example. In this case, the first substrate and the second substrate may be formed through double molding of resins having different dielectric constants. Specifically, by, after injection molding the first substrate, injection molding the second substrate with the first substrate (first antenna unit) being an insert component, the first substrate and the second substrate formed of different materials can be integrally formed.

Advantageous Effect of Invention

As described above, according to one embodiment of the present invention, it is possible to provide the multiband antenna, which can receive radio waves in a wide range of frequency bands, which can be manufactured at low cost, and which can be installed in small space.

BRIEF DESCRIPTION OF DRAWINGS

FIG. 3(a) illustrates a state after a punching step, FIG. 3(b) illustrates a state after a bending step, FIG. 3(c) illustrates a state after a first substrate is injection molded, FIG. 3(d) illustrates a state after a second substrate is injection molded, and FIG. 3(e) illustrates a state after a separating step.

DESCRIPTION OF EMBODIMENTS

Embodiments of the present invention are described in the following with reference to the drawings.

Figure 1:
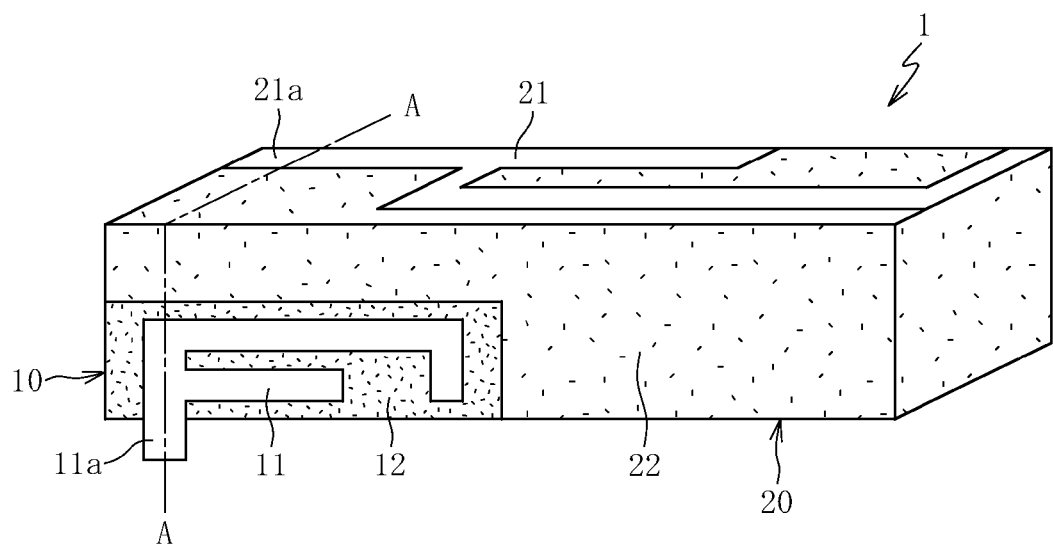
FIG. 1 is a perspective view of a multiband antenna according to an embodiment of the present invention.

As illustrated in FIG. 1, a multiband antenna 1 according to an embodiment of the present invention is substantially in the shape of a rectangular parallelepiped as a whole. The multiband antenna 1 comprises a first antenna unit 10 and a second antenna unit 20, which are integral with each other. The first antenna unit 10 comprises a first antenna pattern 11 formed of a conductor and a first substrate 12 (illustrated as a densely dotted area) formed of a dielectric. The second antenna unit 20 comprises a second antenna pattern 21 formed of a conductor and a second substrate 22 (illustrated as a sparsely dotted area) formed of a dielectric. The multiband antenna 1 has a length in a longitudinal direction of about 3 to 10 mm. Note that, in the following description, a vertical direction illustrated in FIG. 1 is described as a "vertical direction", but this does not mean to limit the use mode of the multiband antenna 1.

Figure 2:
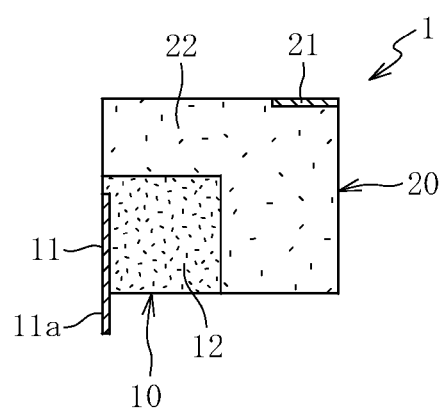
FIG. 2 is a sectional view taken along the plane including the line A-A of the multiband antenna.

The first antenna pattern 11 and the second antenna pattern 21 are formed of a conductive plate, such as a metal plate, specifically, a copper plate, a steel plate, a SUS plate, a brass plate, or the like. The conductive plate may be plated (for example, gold-plated) as necessary. The conductive plate has a thickness of about 0.2 to 0.8 mm. The first antenna pattern 11 is provided on a surface of the first substrate 12 while the second antenna pattern 21 is provided on a surface of the second substrate 22 (see FIG. 2). In order to secure adhesion with respect to the substrates 12 and 22, it is preferred that at least portions of surfaces of the antenna patterns 11 and 21 joined to the surfaces of the substrates 12 and 22, respectively, be rough to some extent, and, for example, are set to have surface roughness (arithmetic mean roughness) Ra of 1.6 or more, preferably 3.2 or more. In this embodiment, as illustrated in FIG. 1, the first antenna pattern 11 is provided only on a side surface on a front side of the multiband antenna 1, and the second antenna pattern 21 is provided only on an upper surface of the multiband antenna 1.

Parts of the antenna patterns 11 and 21 function as feeding terminal portions. In the illustrated example, an end of the first antenna pattern 11 protrudes downward from the first substrate 12, and the protruding portion functions as a feeding terminal portion 11a. A feeding terminal portion 21a is provided at one end of the second antenna pattern 21 in the longitudinal direction. Feeders (not shown) are connected to the feeding terminal portions 11a and 21a, respectively.

The first substrate 12 is formed of a dielectric, for example, a resin or ceramic. The first substrate 12 of this embodiment is an injection molded product of a resin with the first antenna pattern 11 being an insert component. In the illustrated example, the surface of the first substrate 12 and the surface of the first antenna pattern 11 are flush with each other. The first substrate 12 is formed of, for example, a resin having a dielectric constant of 4 or more. Specifically, as a base resin, for example, polyphenylene sulfide (PPS), a liquid crystal polymer (LCP), or the like may be used. Further, a filler to be mixed in the resin is not specifically limited, and, for example, ceramic maybe mixed. Note that, the resin having a dielectric constant of 4 or more is not limited to a resin having a base resin dielectric constant of 4 or more, and a resin having a dielectric constant of 4 or more as a whole through mixture of the filler is also included.

The second substrate 22 is formed of a dielectric having a dielectric constant different from that of the first substrate 12. The second substrate 22 of this embodiment is an injection molded product of a resin with the first antenna unit 10 (first antenna pattern 11 and first substrate 12) and the second antenna pattern 21 being insert components. In the illustrated example, the surface of the second substrate 22 and the surface of the second antenna pattern 21 are flush with each other. Note that, specific examples of a material of the second substrate 22 are similar to those of the first substrate 12, and thus, description thereof is omitted in order to avoid redundancy.

Next, a method of manufacturing the above-mentioned multiband antenna 1 is described with reference to FIGS. 3. The multiband antenna 1 is manufactured through (a) a punching step, (b) a bending step, (c) a first injection molding step, (d) a second injection molding step, and (e) a separating step in this order.

First, in the punching step, the conductive plate is punched into a predetermined shape using a punching press die (not shown). Specifically, as illustrated in FIG. 3(a), a planar development shape 31 is formed in which the first antenna pattern 11 and the second antenna pattern 21 are developed in a plane. In this embodiment, a conductive plate (hoop material 30) in the shape of a long plate is punched so that a plurality of the planar development shapes 31 are arranged in a longitudinal direction. The planar development shape 31 is connected to a frame 33 of the hoop material 30 via bridges 32.

Figure 3:
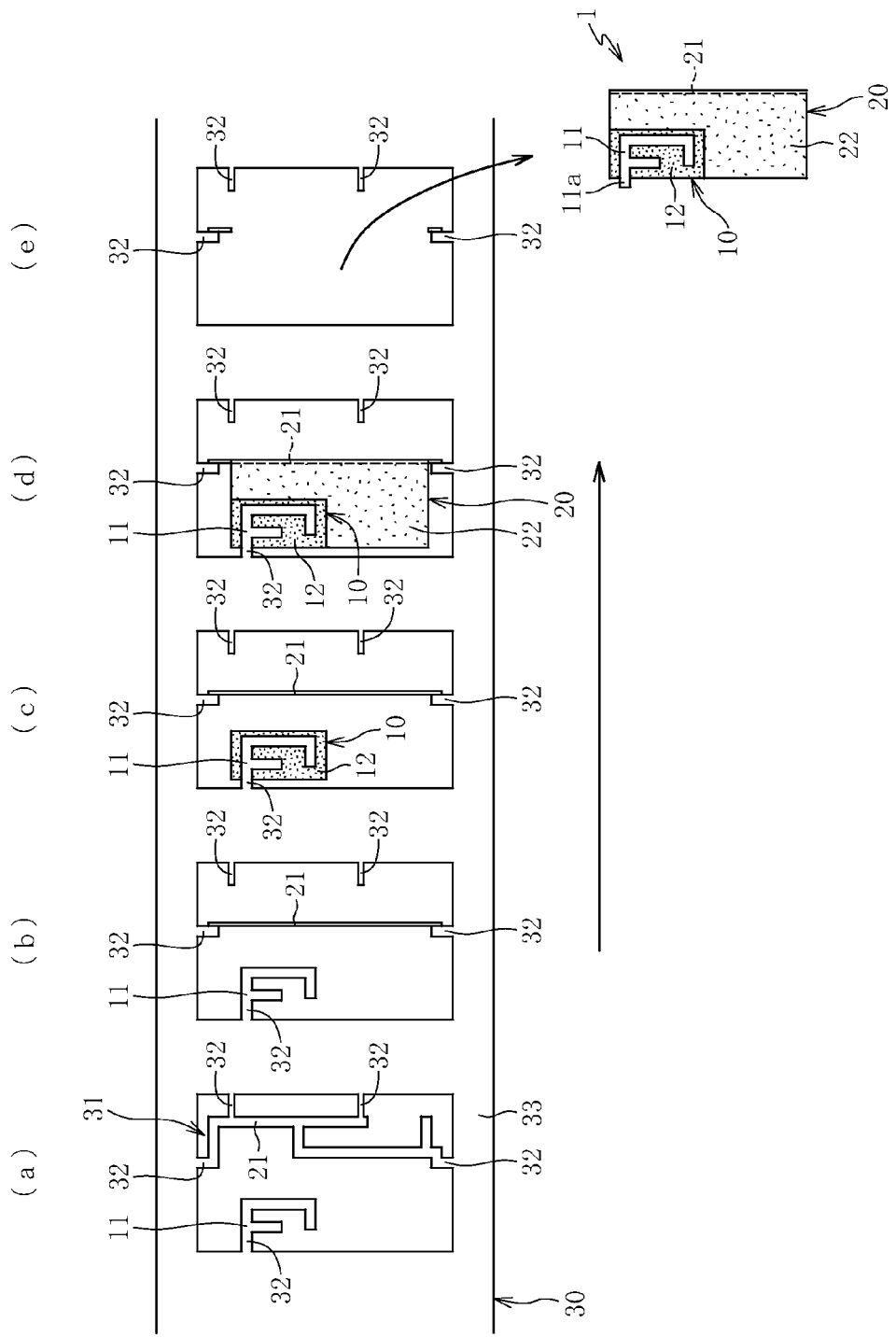
FIGS. 3 illustrate a hoop material used in a manufacturing method according to an embodiment of the present invention.

Then, the hoop material 30 is fed in a direction shown by an arrow in FIG. 3 to supply the planar development shape 31 to the bending step. In the bending step, the planar development shape 31 in the hoop material 30 is bent with a bending press die (not shown) to form the first antenna pattern 11 and the second antenna pattern 21 in predetermined shapes (see FIG. 3(b)). The bending step is carried out under a state in which the first antenna pattern 11 and the second antenna pattern 21 are coupled to the frame 33 of the hoop material 30 via the bridges 32. Note that, when the planar development shape 31 is bent, some of the bridges 32 are separated from the antenna patterns, but each of the antenna patterns is connected to the frame 33 via at least one bridge 32. In the illustrated example, the first antenna pattern 11 is connected to the frame 33 of the hoop material 30 via one bridge 32, and the second antenna pattern 21 is connected to the frame 33 of the hoop material 30 via two bridges 32 provided on both ends in the longitudinal direction thereof. This enables the first antenna pattern 11 and the second antenna pattern 21 to be bent keeping the state of being integrated with the hoop material 30. Note that, the bending step may be carried out by pressing once, or may be carried out by pressing a plurality of times.

Then, the hoop material 30 is further fed to supply the first antenna pattern 11 and the second antenna pattern 21 to the injection molding step. In this embodiment, by carrying out the first injection molding step of forming the first substrate 12 and the second injection molding step of forming the second substrate 22 in this order, the first substrate 12 and the second substrate 22 are formed through double molding. Specifically, first, under a state in which the first antenna pattern 11 is placed as an insert component in a cavity of a first injection molding mold (not shown), a resin is injected into the cavity to form the first substrate 12. This forms the first antenna unit 10 (first injection molding step, see FIG. 3(c)). Then, the hoop material 30 is further fed, and, under a state in which the first antenna unit 10 and the second antenna pattern 21 are placed in a cavity of a second injection molding mold (not shown), a resin is injected into the cavity to form the second substrate 22. This forms the second antenna unit 20, and at the same time, the first antenna unit 10 and the second antenna unit 20 are integrated (second injection molding step, see FIG. 3(d)).

Finally, in the separating step, the molded product (multiband antenna 1) is separated from the frame 33 of the hoop material 30 (see FIG. 3(e)). In the illustrated example, the bridge 32 for connecting the first antenna pattern 11 and the frame 33 is cut on a root side (frame 33 side) so as to be integrated with the first antenna pattern 11, and this bridge 32 functions as the feeding terminal portion 11a. The multiband antenna 1 may be separated from the hoop material 30 soon after the injection molding step, or the molded product may be temporarily wound together with the hoop material 30. By winding the multiband antenna 1 together with the hoop material 30, not only storage and conveyance thereof are easy but also the state of the multiband antennas 1 in alignment with one another can be maintained to prevent interference of the multiband antennas 1.

In the manufacturing steps described above, by carrying out pressing with the bending press die and clamping of the first and second injection molding molds by a common driving unit (press machine), the necessity of providing separate driving units for the respective molds can be eliminated to simplify the system. Further, by carrying out the bending with the bending press die and clamping of the first and second injection molding molds at the same time, cycle time can be cut.

The present invention is not limited to the above-mentioned embodiment. Now, description is made of other embodiments of the present invention. Parts having the same functions as those in the above-mentioned embodiment are denoted by the same reference symbols, and redundant description thereof is omitted.

For example, in the above-mentioned bending step, when bending operation is in two stages or when, after the conductive plate is bent with the bending press die, the conductive plate is required to be further bent, the conductive plate may be bent by an actuator (not shown) provided separately from the clamping force on the first and second injecting molding molds. The actuator may be provided inside the bending press die, or maybe provided outside the bending press die. As the actuator, for example, an air cylinder, a hydraulic cylinder, a motor, or the like may be used.

Further, in the embodiment described above, the antenna patterns 11 and 21 are provided on the surfaces of the substrates 12 and 22, respectively, but the present invention is not limited thereto, and part or all of the antenna patterns may be embedded in the substrates (not shown).

Further, in the embodiment described above, a case is described in which the multiband antenna is formed of two antenna units (first antenna unit 10 and second antenna unit 20), but the present invention is not limited thereto, and the multiband antenna may be formed of three or more antenna units (not shown).

Figure 4:
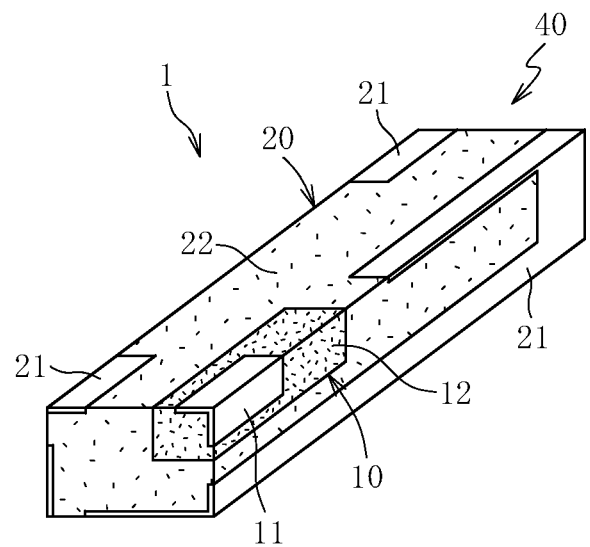
FIG. 4 is a perspective view of a multiband antenna according to another embodiment of the present invention.

Further, in the embodiment described above, a case is described in which each of the first antenna pattern 11 and the second antenna pattern 21 is provided on one side surface of the multiband antenna 1, but the present invention is not limited thereto, and each of the antenna patterns may be provided on a plurality of side surfaces. Further, in the embodiment described above, a case is described in which each of the first antenna pattern 11 and the second antenna pattern 21 is formed of a continuous conductor, but each of the antenna patterns may be formed of a plurality of separate conductors. For example, in a multiband antenna 40 illustrated in FIG. 4, the first antenna pattern 11 is formed of one conductive plate that is continuous over a plurality of side surfaces, and the second antenna pattern 21 is formed of a conductive plate that is continuous over a plurality of side surfaces and a plurality of conductive plates separated therefrom. The multiband antenna 1 can be manufactured by, for example, after the conductive plate (planar development shape 31) is bent to form the first antenna pattern 11 and the second antenna pattern 21 each having a three-dimensional shape in the bending step, carrying out the first injection molding step and the second injection molding step with the three-dimensional antenna patterns 11 and 21 being insert components.

Further, in the embodiment described above, a case is described in which the substrates 12 and 22 are injection molded under a state in which the antenna patterns 11 and 21 are connected to the hoop material 30, but the present invention is not limited thereto. For example, the first antenna unit 10 may be formed in a separate step, and the second antenna unit 20 may be formed by injection molding the second substrate 22 with the first antenna unit 10 being an insert component. In this case, the first substrate 12 of the first antenna unit 10 may be formed of a material that is not suitable for injection molding, for example, ceramic.

REFERENCE SIGNS LIST 1 multiband antenna
10 first antenna unit
11 first antenna pattern
12 first substrate
20 second antenna unit
21 second antenna pattern
22 second substrate
30 hoop material

The invention claimed is:
1. A multiband antenna, comprising:
 a first antenna unit comprising:
  a first antenna pattern formed of a conductive plate; and
  a first substrate formed of a dielectric, for holding the first antenna pattern; and
 a second antenna unit comprising:
  a second antenna pattern formed of a conductive plate separated from the first antenna pattern; and
  a second substrate formed of a dielectric having a dielectric constant different from the dielectric constant of the first substrate, for holding the second antenna pattern,
 wherein the first antenna pattern is provided only on a surface of the first substrate, and the second antenna pattern is provided only on a surface of the second substrate,
 wherein the first substrate of the first antenna pattern is covered with the second substrate of the second antenna pattern from three directions orthogonal to each other so that the multiband antenna is substantially in the shape of a rectangular parallelepiped as a whole, and wherein the first antenna pattern is perpendicular to the second antenna pattern.

2. The multiband antenna according to claim 1, wherein the first antenna unit is formed by injection molding the first substrate with the first antenna pattern, the first antenna pattern being an insert component.

3. The multiband antenna according to claim 2, wherein the first substrate and the second substrate are formed through double molding of resins having different dielectric constants.

4. A method of manufacturing a multiband antenna, the multiband antenna comprising:
   a first antenna unit comprising:
      a first antenna pattern formed of a conductive plate; and
      a first substrate formed of a dielectric, for holding the first antenna pattern; and
   a second antenna unit comprising:
      a second antenna pattern formed of a conductive plate separated from the first antenna pattern; and
      a second substrate formed of a dielectric having a dielectric constant different from the dielectric constant of the first substrate, for holding the second antenna pattern,
   the first antenna pattern being provided only on a surface of the first substrate, and the second antenna pattern being provided only on a surface of the second substrate,
   the first substrate of the first antenna pattern is covered with the second substrate of the second antenna pattern from three directions orthogonal to each other so that the multiband antenna is substantially in the shape of a rectangular parallelepiped as a whole, and
   wherein the first antenna pattern is perpendicular to the second antenna pattern,
   the method comprising the steps of:
      forming the first antenna unit; and
      forming the second antenna unit and integrating the first antenna unit and the second antenna unit by injection molding the second substrate with the first antenna unit and the second antenna pattern, the first antenna unit and the second antenna pattern being insert components.

5. The method of manufacturing a multiband antenna according to claim 4, wherein the forming the first antenna unit comprises injection molding the first substrate with the first antenna pattern, the first antenna pattern being an insert component.

6. The method of manufacturing a multiband antenna according to claim 5, further comprising forming the first substrate and the second substrate through double molding of resins having different dielectric constants.

* * * * *